United States Patent [19]
Kim

[11] Patent Number: 6,167,139
[45] Date of Patent: Dec. 26, 2000

[54] APPARATUS AND METHOD FOR CONTROLLING SOUND FOR AUDIO/VIDEO APPLIANCE

[75] Inventor: Mun Seob Kim, Kyoungsangbuk-Do, Rep. of Korea

[73] Assignee: LG Electronics Inc., Seoul, Rep. of Korea

[21] Appl. No.: 08/987,860

[22] Filed: Dec. 9, 1997

[30]     Foreign Application Priority Data

Dec. 11, 1996 [KR]   Rep. of Korea ..................... 96-64452

[51] Int. Cl.[7] .............................. H03G 9/00; H03G 3/00
[52] U.S. Cl. ........................... 381/102; 381/104; 84/622
[58] Field of Search .................................. 381/101, 102, 381/104, 109, 103; 84/622, 659, 665, 692

[56]           References Cited

U.S. PATENT DOCUMENTS

| | | | |
|---|---|---|---|
| 4,227,048 | 10/1980 | Nagata | 381/101 |
| 4,292,467 | 9/1981 | Olden et al. | 381/101 |
| 5,127,058 | 6/1992 | Yamasaki et al. | 381/102 |
| 5,138,665 | 8/1992 | Ito | 381/104 |
| 5,247,864 | 9/1993 | Konishi | 84/477 R |
| 5,271,063 | 12/1993 | D'Alayer De Costemore D'Arc | 381/102 |
| 5,418,324 | 5/1995 | Konishi et al. | 84/611 |
| 5,446,505 | 8/1995 | Soo et al. . | |
| 5,530,924 | 6/1996 | Miller | 381/101 |
| 5,796,852 | 8/1998 | Yamaguchi | 381/104 |
| 5,883,963 | 3/1999 | Tonella | 381/102 |

FOREIGN PATENT DOCUMENTS 6268939   3/1993   Japan .

*Primary Examiner*—Forester W. Isen
*Assistant Examiner*—Xa Mei
*Attorney, Agent, or Firm*—Oppenheimer Wolff & Donnelly LLP

[57]            ABSTRACT

A sound control apparatus and method for an audio/video appliance are disclosed. The apparatus includes a sound control section for controlling and outputting volume and tone of a sound signal, a sound output section for outputting the sound signal from the sound control section to a speaker, and a key input section for adjusting the volume and tons of the sound signal, the apparatus comprising a controller, connected to the sound control section and the key input section, for displaying symbols representative of the volume and tone level in accordance with the input of the key input section, a memory for storing threshold values of the tone level corresponding to different levels of the volume, respectively, an on-screen display (OSD) processor for processing an OSD signal corresponding to data to be displayed as the symbols inputted from the controller, an image output section for outputting the OSD signal from the OSD processor being superimposed on an image signal, and a display for displaying the OSD signal superimposed on the image signal.

6 Claims, 3 Drawing Sheets

APPARATUS AND METHOD FOR CONTROLLING SOUND FOR AUDIO/VIDEO APPLIANCE

BACKGROUND OF THE INVENTION

1. Field of the Invention

The present invention relates to a sound control apparatus and method for an audio/video appliance which can prevent distortion of high and low frequency components of sound caused by an excessive adjustment of tone.

2. Description of the Related Art

FIG. 1 is a block diagram of a conventional sound control apparatus for a video appliance such as a monitor or a television receiver.

Referring to FIG. 1, the conventional sound control apparatus includes keys K1, K2, K3 for adjusting the volume, treble, and bass of sound, respectively, a sound control section 1 for controlling the volume, treble, and bass of the sound signal in accordance with key signals inputted through the keys K1, K2, K3, and a sound output section 2 for outputting the sound signal from the sound control section 1 to a speaker 3.

According to the sound control apparatus as constructed above, the sound control section 1 controls the volume, treble, and bass of the input sound signal according to a presently determined level to output the controlled sound to the sound output section 2. At that time, if a user operates the volume adjusting key K1, the sound control section 1 controls the sound volume to be on the level adjusted by the manipulation of the key K1, and then outputs the adjusted sound volume. Accordingly, the sound signal is outputted with the volume set by the user to the speaker 3 via the sound output section 2.

Thereafter, if the user operates the treble adjusting key K2, the sound control section 1 controls the treble of the sound to be in the value adjusted by means of the key K2, and then outputs the adjusted treble of the sound. Accordingly, the sound signal is outputted with the treble value set by the user to the speaker 3 via the sound output section 2.

The control of the bass is performed in a similar manner to the control of the treble manner as described above, and thus the description thereof will be omitted.

With the above description, the conventional sound control apparatus can vary the treble or bass level from the minimum value to the maximum value, regardless of the present volume level, by means of one of the adjusting keys K2 and K3.

According to the conventional sound control apparatus, however, if the user adjusts treble or bass to the maximum or minimum level, when the present volume level is the maximum value, the high frequency component or the low frequency component of the sound to be outputted will be distorted, thereby deteriorating the sound quality.

SUMMARY OF THE INVENTION

It is an object of the present invention to solve the above problem, and to provide a sound control apparatus and method for an audio/video appliance which can prevent the high or low frequency component of the sound from being distorted due to an excessive adjustment of the tone by pre-storing the predetermined threshold values of the treble and bass levels, in accordance with the volume levels, respectively, and controlling the values of the treble and bass within the threshold value corresponding to the present volume level during an adjustment of the sound.

In order to achieve the above object, according to one aspect of the present invention, there is provided an apparatus for controlling sound for an audio/video appliance having a sound control section for controlling and outputting volume and tone of a sound signal, a sound output section for outputting the sound signal from the sound control section to a speaker, and a key input section for adjusting the volume and tone of the sound signal, the apparatus comprising a controller, connected to the sound control section and the key input section, for displaying symbols representative of the volume and tone level in accordance with the input of the key input section, a memory for storing threshold values of the tone level corresponding to different levels of the volume, respectively, an on-screen display (OSD) processor for processing an OSD signal corresponding to data to be displayed as the symbols inputted from the controller, an image output section for outputting the OSD signal from the OSD processor being superimposed on an image signal, and a display for displaying the OSD signal superimposed on the image signal According to other aspect of the present invention, there is provided a method for controlling sound comprising the steps of storing a plurality of predetermined threshold values of tone in accordance with levels of volume in a memory, receiving a desired level of the volume from a user, reading out from the memory the threshold value of the tons corresponding to the desired volume level, and displaying the read-out threshold value.

The method further comprises the steps of receiving from the user a desired level of the tone below the displayed threshold value of the tone, controlling a sound control section in accordance with the desired level of the tone, and producing the desired levels of the volume and tone from the sound control section.

The tone inputting step includes a step of inputting a level of treble or bass.

According to another aspect of the present invention, there is provided an apparatus for controlling sound including a sound control section for outputting volume and tone of a sound signal, and a sound output section for outputting the sound signal from the sound control section through a speaker, the apparatus comprising an input section for adjusting volume and tone levels by a user, a memory for storing threshold values of the tone levels, each threshold value representing the recommended maximum tone level for a given volume level, a controller connected to the sound control section, the input section, and the memory, the controller operable to read the volume level inputted by the user through the input section, read the memory to retrieve the threshold value according to the volume level inputted by the user, and output a signal corresponding to the retrieved threshold value, and a display section connected to the controller and operable to display a symbol indicative of the recommended maximum tone level corresponding to the read volume level according to the signal outputted by the controller.

BRIEF DESCRIPTION OF THE DRAWINGS

The above object, other aspects, and advantages of the invention will become apparent by describing the preferred embodiment thereof with reference to the accompanying drawings, in which.

DETAILED DESCRIPTION OF THE PREFERRED EMBODIMENT

Figure 1:
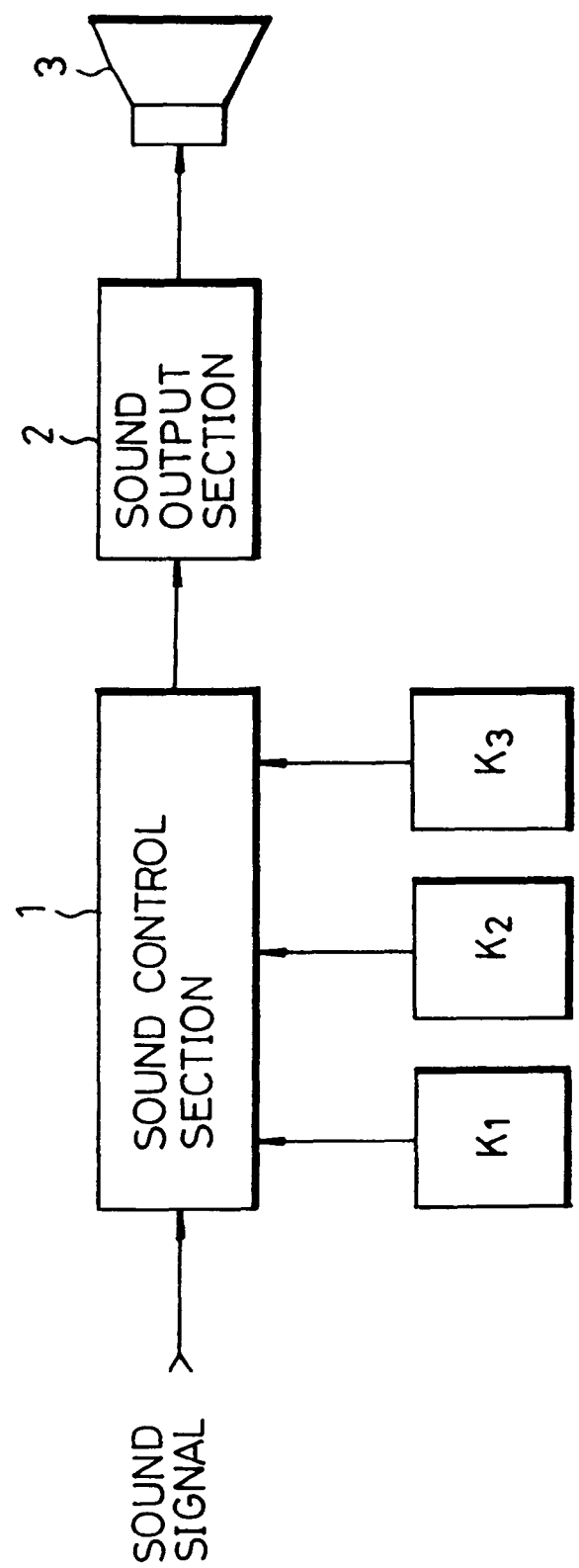
FIG. 1 is a block diagram illustrating a conventional sound control apparatus for an audio/video appliance.
Figure 2:
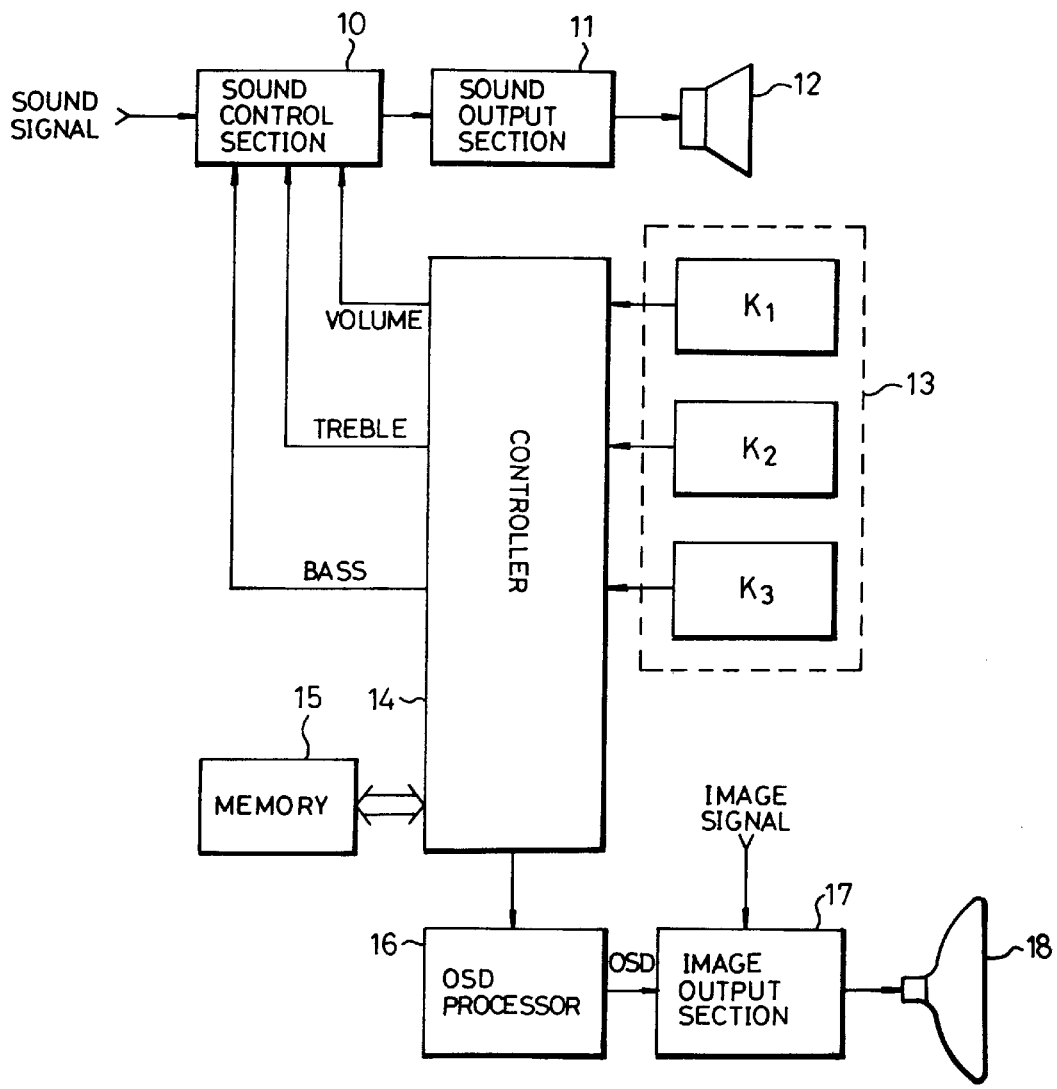
FIG. 2 is a block diagram illustrating a sound control apparatus according to the present invention.

Referring now to FIG. 2, there is diagrammatically shown a sound control apparatus according to the present invention comprising a sound control section 10 for controlling the volume, treble, and bass of an input sound signal, a sound output section 11 for outputting the sound signal from the sound control section 10 to a speaker 12, and a key input section 13, for example, including a number of keys, for respectively adjusting the volume, treble, and bass of the sound.

A controller 14 for controlling the display of concerned symbols corresponding to the input of a key is connected to the sound control section 10 and the key input section 13.

A memory 15 for storing predetermined threshold values of the treble and bass levels in accordance with the volume level, and an on-screen display (OSD) processor 16 for OSD-processing data for displaying the symbols, inputted from the controller 14 are connected to the controller 14.

Also, the sound control apparatus according to the present invention includes an image output section 17 for outputting an image signal superimposed with an OSD signal which is outputted from the OSD processor 16, and a display 18 for displaying the image signal outputted from the image output section 17.

With the construction as described above, if the user operates a sound adjusting key among the keys provided in the key input section 13 to adjust the volume, treble, or bass, the controller 14 identifies the input of the sound adjusting key and converts the present mode into a sound adjusting mode.

The controller 14 outputs the data for displaying the symbols representative of the volume, treble, or bass level to the OSD processor 16, and the OSD processor 16 OSD-processes the inputted data to output the corresponding OSD signal to the display 18 through the image output section 17, so that the symbols representative of the volume or tone levels are displayed.

The displayed symbols indicate the present values of the volume, treble, and bass which are read out from the memory 15. At that time, the display of the symbols representative of the treble and bass is performed in a manner that the maximum adjusted value thereof is limited corresponding to the present level of volume. The threshold of the maximum adjusted value of the tone is made, for example, as a below table.

TABLE

| Volume (%) | 0–58 | 60 | 64 | 70 | 76 | 80 | 86 | 90 | 92–100 |
|---|---|---|---|---|---|---|---|---|---|
| treble (%) | 100 | 96 | 80 | 70 | 62 | 60 | 56 | 56 | 54 |
| bass (%) | 100 | 96 | 78 | 68 | 64 | 58 | 56 | 54 | 54 |

(100%:maximum value, 50%:intermediate value)

According to the table, the threshold values of the treble and bass are determined corresponding to the increase of the volume level of the sound being outputted through the speaker. In case that the volume level is in the range of 0% to 58%, the treble or bass may be adjusted within the range of 100% without deteriorating the high and low frequency components. In case that the volume level is 70%, if the treble is adjusted above 70% or if the bass is adjusted above 68%, the high and low frequency components of the sound are distorted. And, in case that the volume level is in the range of 92% to 100%, even though the treble or bass is adjusted above 54%, the high and low frequency components of the outputted sound are distorted.

Therefore, because the symbols representative of the treble and bass on the display indicate the threshold of the maximum adjusted level corresponding to the present level of the volume stored in the memory 15 with reference to the above table, even though the user adjusts the treble or bass in maximum by using the displayed symbols, the high and low frequency components of the outputted sound are not distorted.

Figure 3:
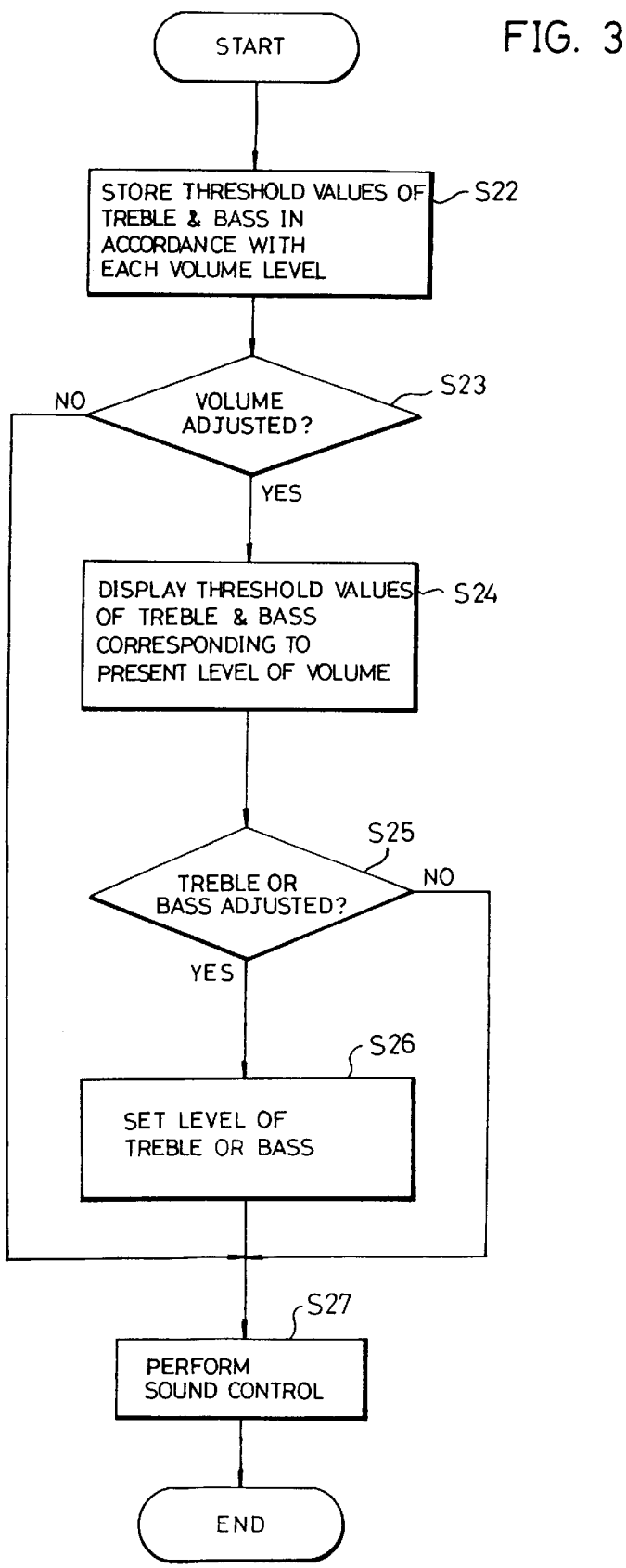
FIG. 3 is a flow chart incorporating a method for controlling the sound according to the present invention.

The adjustment of the treble or bass after the present level of the volume is set to 80% by the user will be now described with reference to the FIG. 3, As described above, the threshold values of the treble and bass corresponding to the volume level are stored in the memory 15 (step S22). When the appliance is turned on, the symbols are displayed. The user sets 80% of the volume level by operating the volume selection key, and a '+' or '−' key in the key input section 13 (step S23). The controller 14 determines the inputted 80% of the volume level as the present volume level and stores the volume level in the memory 15, and then controls the sound control section 10 so that the sound is outputted with the volume level of 80% through the speaker 12 (step S27).

When the present volume level is set to 80%, the threshold values of the treble and bass are changed in accordance with the volume level of 80% (step S24). More specifically, the displayed maximum values of the treble and bass represent the thresholds values.

If the user changes the sound adjusting item to the treble or bass by operating a specified key provided on the key input section 13, and then operates the '+' or '−' key to adjust the value of the treble or bass (step S25), the controller 14 sets the level of the adjusted treble or bass (step S26). Accordingly, the controller 14 outputs the control signal for controlling the value of the treble or bass to be the set value, to the sound control section 10, so that the value of the treble or bass of the outputted sound is adjusted to the value set by the user.

In adjusting the treble or bass, although the user has set the level of the treble or bass to the maximum value of the symbols on the display, the displayed maximum value of the treble or bass is within the range where the high and low frequency components are not deteriorated, thereby producing a high-fidelity sound.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus for controlling sound for an audio/video appliance having a sound control section for controlling and outputting volume and tone of a sound signal, a sound output section for outputting the sound signal from the sound control section to a speaker, and a key input section for adjusting the volume and tone of the sound signal, the apparatus comprising:

a memory for storing threshold values of the tone level corresponding to different levels of the volume, respectively;

a controller, connected to the sound control section, the key input section and the memory, the controller being arranged to select the threshold value from the memory that corresponds to a volume level set using the key input section and control the display of symbols indicative of the volume and tone levels in accordance with the input of the key input section and the selected threshold value;

an on-screen display (OSD) processor for processing an OSD signal corresponding to data to be displayed as the symbols inputted from the controller;

an image output section for outputting the OSD signal from the OSD processor being superimposed on an image signal; and a display for displaying the OSD signal superimposed on the image signal.

2. The apparatus as claimed in claim 1, wherein the tone includes treble and bass.

3. In an audio/video appliance a method for controlling sound comprising the steps of:

storing a plurality of predetermined threshold values of tone in accordance with levels of volume in a memory;

receiving a desired level of the volume from a user;

reading out from the memory the threshold value of the tone corresponding to the desired volume level;

controlling the display of symbols indicative of the volume and tone levels in accordance with the read-out threshold value;

processing an on-screen display (OSD) signal corresponding to data to be displayed as the symbols;

outputting the OSD signal, being superimposed on an image signal; and displaying the OSD signal superimposed on the image signal.

4. The method according to claim 3, further comprising the steps of:

receiving from the user a desired level of the tone below the displayed threshold value of the tone;

controlling a sound control section in accordance with the desired level of the tone; and producing the desired levels of the volume and tone from the sound control section.

5. The method according to claim 4, wherein the step of receiving a desired level of the tone includes a step of inputting a level of treble or bass.

6. An apparatus for controlling sound including a sound control section for outputting volume and tone of a sound signal, and a sound output section for outputting the sound signal from the sound control section through a speaker, the apparatus comprising:

an input section for adjusting volume and tone levels by a user;

a memory for storing threshold values of the tone levels, each threshold value representing the recommended maximum tone level for a given volume level;

a controller connected to the sound control section, the input section, and the memory, the controller operable to read the volume level inputted by the user through the input section, read the memory to retrieve the threshold value according to the volume level inputted by the user, and output a signal corresponding to the retrieved threshold value; and a display section connected to the controller and operable to display a symbol indicative of the recommended maximum tone level corresponding to the read volume level according to the signal outputted by the controller.

* * * * *